INVENTORS
D. M. VESPER
H. M. NEER

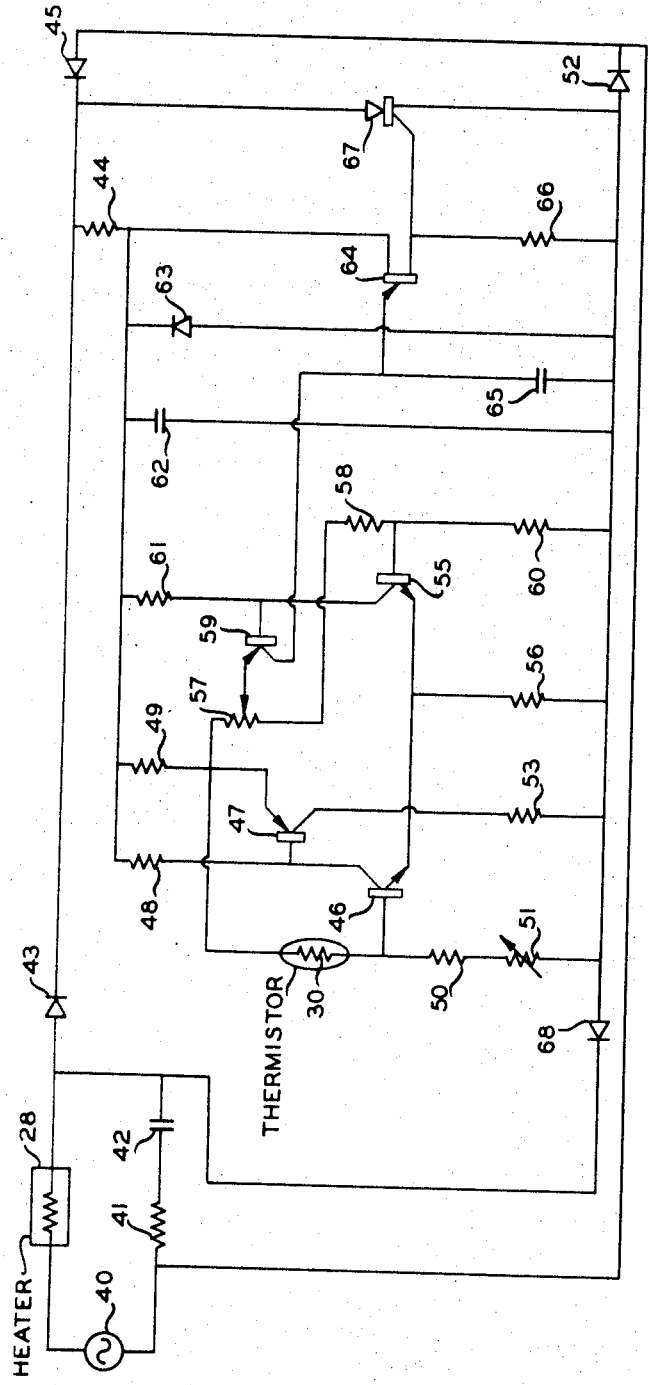
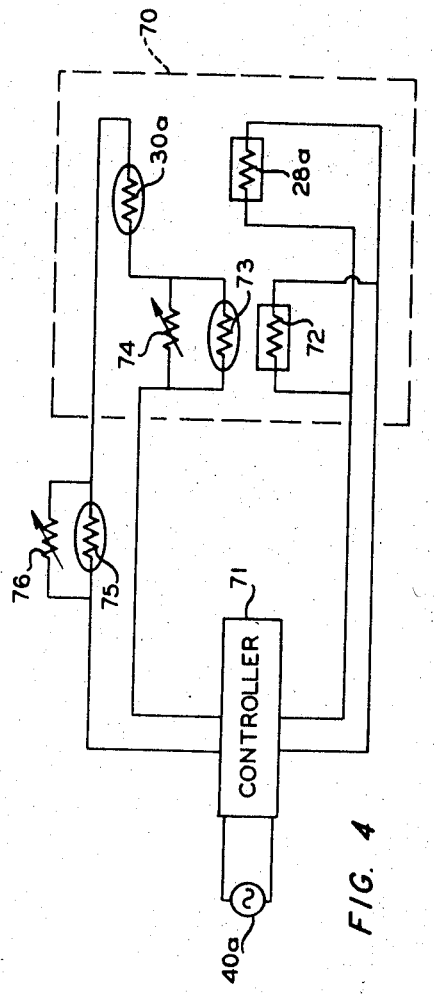
FIG. 3
FIG. 4

United States Patent Office 3,440,397
Patented Apr. 22, 1969

3,440,397
TEMPERATURE CONTROLLER
Daniel M. Vesper and Harold M. Neer, Bartlesville, Okla., assignors to Phillips Petroleum Company, a corporation of Delaware
Filed Apr. 27, 1966, Ser. No. 545,743
Int. Cl. G05d 23/24; H05b 1/02
U.S. Cl. 219—209                                    10 Claims

ABSTRACT OF THE DISCLOSURE

The regulation of temperature in a housing by using temperature sensitive detectors to activate a control circuit which in turn regulates the current flowing through heating elements. Heating and heat-exchange fluid circulating means are disclosed for lowering as well as raising temperature in the housing.

---

It is necessary to maintain various analytical and process systems at constant temperatures. One particular need for temperature control occurs in the analysis of materials by chromatography, wherein it is customary to enclose the chromatographic analyzer or components thereof in a housing that is maintained at a constant temperature. This invention is directed toward providing improved temperature control systems which can be employed to advantage with analytical instruments. In accordance with one aspect of this invention, a temperature controlled housing is provided which is capable of maintaining analytical instruments at constant temperatures. The components to be regulated are positioned in thermal contact with an element that is formed of a material that is a good thermal conductor. An electrical heating element is positioned in thermal contact with the element to provide sufficient heat to maintain a constant temperature. A fluid at a temperature below that to be maintained in the housing is circulated in thermal contact with the element so that as to tend to lower the temperature below that to be maintained. The relative amounts of the cooling fluid and heat are adjusted so as to maintain a precise temperature. This also permits the temperature of the housing to be controlled over a broad range, from below ambient temperature to above ambient temperature.

In accordance with another aspect of this invention, an improved electrical control system is provided to maintain regions of constant temperature. Current is supplied to a heating element at a rate such as to maintain a preselected temperature. The amount of current supplied to the heating element is controlled by a silicon controlled rectifier. Circuit means are provided for regulating the time that the rectifier conducts currents so as to control the current flow through the heating element. In still another aspect of this invention, compensation is made for variations in ambient temperature and supply voltages.

Figure 1:
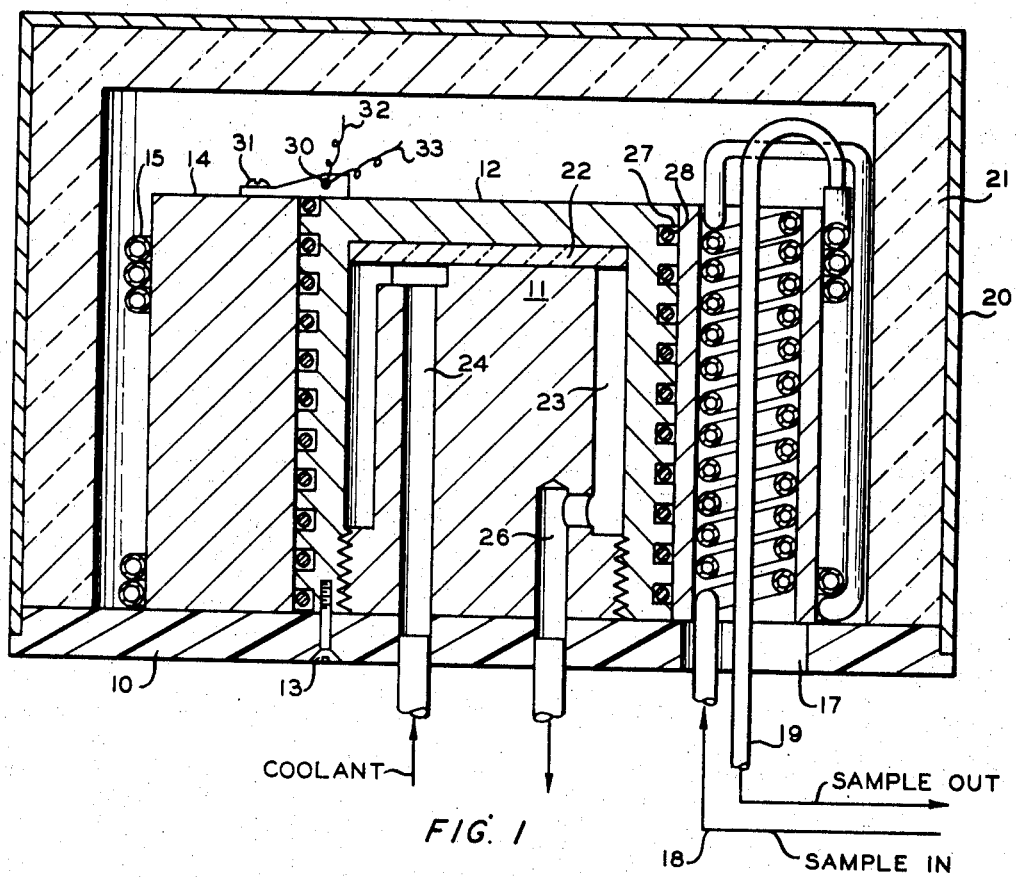
Figure 2:
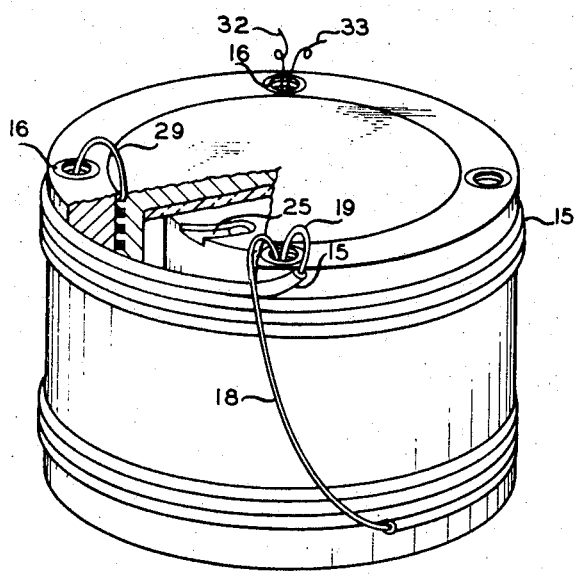
Figure 5:
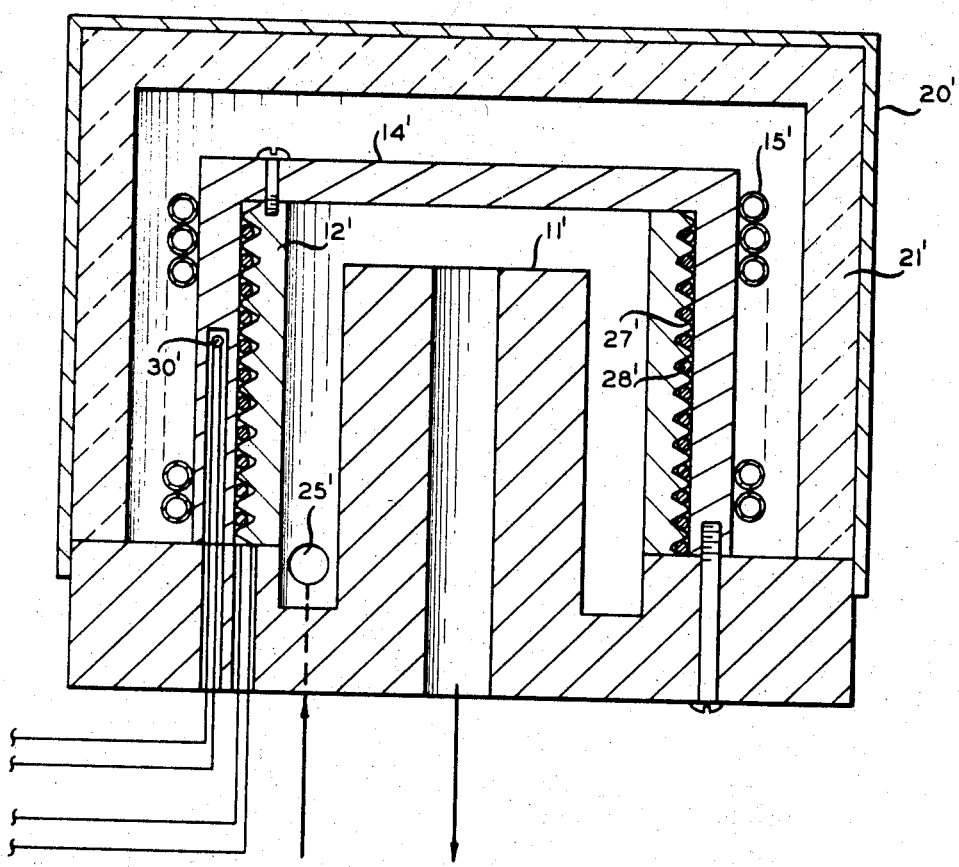

Accordingly, it is an object of this invention to provide improved temperature regulated housings. Another object is to provide improved electrical control systems to regulate temperature. A further object is to provide electrical temperature control systems which compensate for changes in ambient temperature and fluctuations in supply voltages. Other objects, advantages and features of the invention should become apparent from the following detailed description, taken in conjunction with the accompanying drawing in which:

FIGURE 1 is a view, shown partially in section, of a first embodiment of the temperature controlled housing of this invention. FIGURE 2 is a perspective view, shown partially in section, of the inner components of the housing of the electrical controller of this invention. FIGURE 3 is a schematic circuit drawing of a first embodiment of the electrical controller of this invention. FIGURE 4 is a schematic circuit drawing of the modification of the controller of FIGURE 3. FIGURE 5 is a view, shown partially in section, of a second embodiment of the temperature controlled housing of this invention.

Referring now to the drawing in detail and to FIGURES 1 and 2 in particular, there is shown a base 10 which supports an inner mandrel 11 that is formed of a material having good heat conducting properties. Mandrel 11 is surrounded by an outer mandrel 12, the latter being threaded to the inner mandrel and secured to base 10 by screws 13. A sleeve 14 encloses outer mandrel 12. A chromatographic analyzer column 15, which is to be maintained at a constant temperature, encloses sleeve 14 so as to make thermal contact therewith. As illustrated, sleeve 14 is provided with a plurality of openings 16 which communicate with the exterior of the housing through suitable openings 17 in base 10. An inlet conduit 18 extends through opening 17 and is coiled inside an opening 16. Conduit 18 then communicates with one end of column 15. A vent conduit 19 is connected to the second end of column 15 and extends out of the housing. The housing is provided with a cover 20 which has a layer of insulated material 21 secured thereto. A disk of insulating material 22 is positioned between mandrels 11 and 12.

An annular space 23 is formed between mandrels 11 and 12 in order that a cooling fluid can be circulated between these elements. An inlet passage 24 in mandrel 11 extends from an opening in base 10 to the top of annular space 23. A slot 25 is formed in the top of mandrel 11 in communication with passage 24 such that the incoming fluid enters annular space 23 in a direction generally tangential to the wall of mandrel 12. The cooling fluid follows a circular path about mandrel 11 and is removed through a passage 26 which communicates with the bottom of annular space 23. If desired, space 23 can be in the form of a helical path to provide greater circulation of cooling fluid. The side surface of mandrel 12 is provided with a spiral groove 27 which receives an electrical heating element 28. The leads to heating element 28 enter the housing through a conduit 29 that extends through one of the holes 16. A thermistor 30 is secured to the top of the mandrels by a screw 31 so as to be in thermal contact with the mandrels. The leads 32 and 33 to the thermistor also extend through a hole 16.

The circulation of cooling fluid through the housing normally tends to maintain the interior temperature below the desired set point. However, sufficient current is supplied to heating element 28 to elevate the mandrels to the desired temperature. The passage of current through heating element 28 is controlled from the temperature sensed by thermistor 30, as described hereinafter in detail. Coiled inlet conduit 18 provides heat exchange of the sample with sleeve 14 prior to entry into column 15.

The circuit which is employed to regulate the current supplied to heater 28 is illustrated in FIGURE 3. One terminal of heater 28 is connected to the first terminal of an alternating current source 40. A resistor 41 and a capacitor 42 are connected in series between the second terminal of current source 40 and the second terminal of heater 28. A rectifier 43 is connected between the second terminal of heater 28 and the first terminal of resistor 44. A rectifier 45 is connected between the second terminal of current source 40 and the first terminal of resistor 44.

Thermistor 30 forms one arm of a bridge network. The first terminal of thermistor 30 is connected to the base of a transistor 46. The second terminal of thermistor 30 is connected to the emitter of a transistor 47. The collector of transistor 46 is connected directly to the base of transistor 47, and a resistor 48 is connected between the collector of transistor 46 and resistor 44. A resistor 49 is connected between the emitter of transistor 47 and resistor 44. Resistors 50 and 51 and a rectifier 52 are connected in series between the base of transistor 46 and the second terminal of current source 40. A resistor 53 is connected between the collector of transistor 47 and rectifier 52. The emitter of transistor 46 is connected to the emitter of a transistor 55, and a resistor 56 is connected between these two emitters and rectifier 52. A potentiometer 57 and a resistor 58 are connected in series between the emitter of transistor 47 and the base of transistor 55. The contactor of potentiometer 57 is connected to the emitter of transistor 59. A resistor 60 is connected between the base of transistor 55 and rectifier 52. The base of transistor 59 is connected to the collector of transistor 55, and a resistor 61 is connected between the base of transistor 59 and resistor 44. A capacitor 62 is connected between resistor 44 and rectifier 52.

The collector of transistor 59 is connected to the emitter of a unijunction transistor 64, and a capacitor 65 is connected between this emitter and rectifier 52. The first base of transistor 64 is connected directly to resistor 44, and the second base is connected by a resistor 66 to rectifier 52. The second base is also connected to the control electrode of a silicon controlled rectifier 67. Rectifier 67 is connected between rectifiers 43 and 52. A rectifier 68 is connected between rectifiers 52 and 43.

Operating power for the bridge network, the amplifier associated with thermistor 30, and control rectifier 67 is obtained through heater 28 and the rectifier bridge associated therewith. This avoids the need for transformers or auxiliary power supplies. A small current flows through heater 28 at all times, but this is quite small in comparison with the normal operating current of the heater. Unfiltered D.C. current for the amplifier and firing circuit is obtained through resistor 44 from the anode of silicon controlled rectifier 67. This current is regulated by a Zener diode 63 so as to produce a constant voltage. Capacitor 62 filters out any high frequency line noise. Filtering of the 60 cycle ripple is unnecessary because limiting by diode 63 occurs during most of each line half cycle.

Thermistor 30 forms one arm of a bridge circuit. Resistors 50 and 51 form a second arm of the bridge. Potentiometer 57 and thermistor 58 form the third arm, and resistor 60 forms the fourth arm. In normal operation the bridge is balanced so that the ratio of the resistance of thermistor 30 to the resistance of elements 50 and 51 is approximately equal to the ratio of the resistance of elements 57 and 58 to the resistance of element 60. Transistors 46, 47, 55 and 59 and the associated resistors form a two stage differential amplifier for the output signal from the bridge network. The output signal from transistor 59 charges capacitor 65 which is connected to the emitter of unijunction transistor 64. Transistor 64 normally fires at some time during each half cycle when capacitor 65 is charged to the firing level, normally about 12 to 15 volts. The time at which this firing occurs is determined by the current output from transistor 59. A pulse from the lower base of transistor 64 then triggers silicon controlled rectifier 67 into conduction for the remainder of the half cycle. Thus the power output to heater 28 is determined by the temperature sensed by thermistor 30 which controls the conduction period of rectifier 67.

The temperature set point within the housing is adjusted by variable resistor 51. This adjusts the balance point of the bridge. The gain of the controller, in terms of a detected temperature change required to turn the controller on and off, can be adjusted as necessary for system stability by a gain adjustment which introduces negative feedback. This is regulated by potentiometer 57.

FIGURE 4 is a schematic circuit drawing of a temperature regulating system which is capable of compensating for changes in supply voltage and ambient temperature. In this system, a thermistor 30a and a heater 28a are positioned within a housing 70 that is to be regulated. Thermistor 30a is connected in controller 71 which preferably is of the configuration illustrated in FIGURE 3. Operating power is supplied to controller 71 from a current source 40a. Controller 71 regulates the current supplied to heater 28a, as previously described. In order to compensate for fluctuations in current supply 40a, a small auxiliary heater 72 is positioned within housing 70. This heater is connected across the leads which supply current to heater 28a so that the amount of heat generated by heater 72 is a function of the supply voltage. A second thermistor 73 is positioned in close proximity to heater 72 so that the temperature sensed by this heater is a function of the heater output. Thermistor 73 is connected in series with thermistor 30a, and a variable resistor 74 is connected in parallel with thermistor 73 to permit adjustment of the effective resistance of the thermistor. A third thermistor 75 is positioned outside housing 70 to sense the ambient temperature outside the housing. Thermistor 75, which has a variable resistor 76 connected in parallel therewith, is also in connection in series with thermistor 30a. Thermistors 73 and 75 thus function to modify the effective resistance of thermistor 30a as determined by fluctuations in the power supply and in ambient temperature. By suitable adjustment of the resistors associated with these auxiliary thermistors, it is possible to obtain a more uniform regulation of temperature within housing 70. It should be evident that either thermistor 73 or thermistor 75 can be employed as the sole auxiliary element, if desired. Series connected elements 30a, 73 and 75 form one arm of the bridge of FIGURE 3, replacing single element 30 of FIGURE 3.

A second embodiment of the temperature controlled housing of this invention is illustrated in FIGURE 5. This housing is similar in many respects to the housing of FIGURES 1 and 2 and corresponding elements are designated by like primed reference numerals. The base and inner mandrel 11' of FIGURE 3 are formed as one element. Outer mandrel 12' is provided with threads 27' which receive heating element 28'. This mandrel is surrounded by a cap member 14' which supports column 15'. Thermistor 30' is positioned within an opening in member 14'. Cooling fluid is introduced into the housing through a passage which terminates at a port 25' between mandrels 11' and 12'. Port 25' is positioned so that the fluid enters the annular region in a direction tangential thereto. The fluid thus flows in a circular path about mandrel 11' and is withdrawn through an opening in the center of the mandrel. Suitable openings, not shown, are formed in the base of element 11' to introduce fluid into and withdraw fluid from column 15'.

While this invention has been described in conjunction with presently preferred embodiments, it should be evident that it is not limited thereto.

What is claimed is:

1. Temperature control apparatus comprising a housing, the interior of which is to be maintained at a preselected temperature; circulating fluid coolant means; a current source; a first temperature sensitive resistance element positioned within said housing to sense the temperature inside said housing; a second temperature sensitive resistance element positioned externally of said housing to sense the temperature of the environment surrounding said housing; means connecting said first and second resistance elements in series relatioship; an electrical heating element positioned within said housing; means to connect said current source to said heating element; and control means responsive to the combined resistance of said first and second resistance elements to regulate the amount of current supplied to said heating element from said current source.

2. The apparatus of claim 1, further comprising a variable resistance element connected in parallel with said second temperature sensitive resistance element.

3. The apparatus of claim 7, further comprising a variable resistance element connected in parallel with said third temperature sensitive resistance element.

4. The apparatus of claim 1 wherein said housing contains a hollow mandrel of heat conductive material, said material having an elongted recess in the external surface thereof which receives said heating element; a sleeve of heat conductive material enclosing said mandrel; an element, the temperature of which is to be regulated, in thermal contact with the external surface of said sleeve, said first temperature sensitive resistance element is in thermal contact with said sleeve; and wherein said circulating fluid coolant means comprises means to circulate a cooling fluid through the interior of said mandrel.

5. The apparatus of claim 4 wherein said element is a chromatographic column coiled about said sleeve, and said sleeve is provided with a first opening therethrough; and further comprising an inlet conduit extending through said opening to the inlet of said column, said inlet conduit being coiled inside said opening to provide heat exchange with said sleeve.

6. The apparatus of claim 8 wherein said variable impedance circuit means comprises a bridge circuit having said first temperature sensitive resistance element in one arm thereof, a silicon controlled rectifier, means connecting said rectifier in parallel with said impedance means, and means responsive to unbalance of said bridge circuit to control conduction through said rectifier.

7. Temperature control apparatus comprising a housing, the interior of which is to be maintained at a preselected temperature; a current source; a first temperature sensitive resistance element positioned within said housing to sense the temperature inside said housing; a second temperature sensitive resistance element positioned externally of said housing to sense the temperature of the environment surrounding said housing; a third temperature sensitive resistance element positioned within said housing and spaced from said first temperature sensitive resistance element; means connecting said first, second and third resistance elements in series relationship; a first electrical heating element positioned within said housing; a second electrical heating element positioned within said housing adjacent said third temperature sensitive resistance element; means connecting said second heating element in parallel with said first heating element; means to connect said first and second heating elements to said current source; and control means responsive to the combined resistance of said first, second, and third resistance elements to regulate the amount of current supplied to said first and second heating elements from said current source.

8. Temperature control apparatus comprising a housing, the interior of which is to be maintained at a preselected temperature; a current source; a first temperature sensitive resistance element positioned within said housing to sense the temperature inside said housing; a second temperature sensitive resistance element positioned externally of said housing to sense the temperature of the environment surrounding said housing; means connecting said first and second resistance elemets in series relatioship; an electrical heating element positioned within said housing; means to connect said current source to said heating element; impedance means connected in series relationship with said heating element and said current source; and a control means to regulate the amount of current supplied to said heating element from said current source, said control means comprising a variable impedance circuit means connected in parallel with said impedance means, and means responsive to said first temperature sensitive resistance element to regulate the current flow through said variable impedance circuit means in response to changes in resistance of said first temperature sensitive resistance element.

9. The apparatus of claim 8, further comprising a variable resistance element connected in parallel with said second temperature sensitive resistance element.

10. Temperature control apparatus comprising a housing, the interior of which is to be maintained at a preselected temperature; a current source; a first temperature sensitive resistance element positioned within said housing to sense the temperature inside said housing; a second temperature sensitive resistance element positioned externally of said housing to sense the temperature of the environment surrounding said housing; means connecting said first and second resistance elements in series relationship; an electrical heating element positioned within said housing; means to connect said current source to said heating element; and control means to regulate the amount of current supplied to said heating element from said current source, said control means comprising a resistor and a capacitor connected in series relationship with said current source and said heating element, a silicon controlled rectifier, means connecting said rectifier in parallel relationship with said series connected resistor and capacitor, a bridge circuit having said first temperature sensitive resistance element connected in one arm thereof, amplifier means connected to said bridge circuit to amplify any unbalance signal from said bridge circuit, and means responsive to the output signal from said amplifier means to control conduction through said rectifier.

References Cited

UNITED STATES PATENTS

| 2,874,260 | 2/1959 | Huppert et al. | 219—504 |
| 3,028,473 | 4/1962 | Dyer et al. | 219—501 |
| 3,129,588 | 4/1964 | Martin | 73—362 |
| 3,197,616 | 7/1965 | Gade et al. | 219—499 X |

RICHARD M. WOOD, *Primary Examiner.*

C. L. ALBRITTON, *Assistant Examiner.*

U.S. Cl. X.R.

73—23.1; 219—501, 504, 505; 307—310